United States Patent

Rodriguez et al.

[11] Patent Number: 5,735,469
[45] Date of Patent: Apr. 7, 1998

[54] COMPACT DIFFUSER

[75] Inventors: Sergio E. Rodriguez, Woodland Hills; James P. Maddox, Van Nuys; Raymond J. Netzer, Newbury Park; Alan Z. Ullman, Northridge, all of Calif.

[73] Assignee: Boeing North American, Inc., Seal Beach, Calif.

[21] Appl. No.: 653,851

[22] Filed: May 28, 1996

[51] Int. Cl.⁶ .................................................. B05B 7/00
[52] U.S. Cl. .................................... 239/430; 372/58
[58] Field of Search ............................ 239/429, 430, 239/11; 372/58, 59

[56] References Cited

U.S. PATENT DOCUMENTS

| | | |
|---|---|---|
| 4,235,372 | 11/1980 | Salter .............................. 372/58 X |
| 4,247,833 | 1/1981 | Morr et al. ........................ 372/58 X |
| 4,435,810 | 3/1984 | Hasinger et al. .................... 372/58 |
| 4,487,366 | 12/1984 | Davis et al. ........................ 239/11 |

*Primary Examiner*—Lesley D. Morris
*Attorney, Agent, or Firm*—Steven E. Kahm; Harry B. Field

[57] ABSTRACT

A compact diffuser for recovering pressure from a supersonic flow with boundary layers. Sharp splicer plates near the walls form boundary layer scoops and separate the flow into an inner coreflow chapel and outer chambers containing small supersonic ejector nobles. The coreflow without boundary layers undergoes a single near-normal shock to recover pressure. The boundary layers are pumped to the recovery pressure in the outer ejector chambers. The subsonic part of the boundary layer flow to the outer chambers can be choked against boundary layer scoop inlet corners to isolate the upstream flow. The leading edge angle of the splicers may be selected to help induce coreflow shocking.

4 Claims, 2 Drawing Sheets

COMPACT DIFFUSER

BACKGROUND OF THE INVENTION

1. Field of the Invention

This invention relates to a compact diffuser for pressure recovery in a supersonic gas flow and more particularly for pressure recovery in the supersonic flow from the optical cavity of a chemical laser.

2. Description of the Related Art

In chemical lasers, the gas providing optical amplification is usually a supersonic flow across the optical cavity. The flow leaving the cavity is typically at static pressure much lower than the pressure at which it must be exhausted. The flow pressure is first raised as much as possible by supersonic and subsonic diffusers which convert kinetic energy to pressure. The remaining rise to exhaust pressure is accomplished with conventional ejectors or other pumping means.

The supersonic diffuser immediately downstream of the laser cavity contains a shock transition from supersonic low-pressure flow to subsonic high-pressure flow. Since the supersonic diffuser must recover pressure without disrupting the cavity optical path, it is also an isolator between the cavity and the rest of the flow discharge system. The pressure recovery potential of the supersonic cavity flow is reduced by the low-momentum boundary layers on the cavity walls. These boundary layers also provide subsonic channels for the propagation of downstream disturbances into the lasing cavity flow. Thus, diffuser design must consider boundary layer treatment in regard to both pressure recovery and optical quality.

Chemical lasers carry the optical laser energy in chemical form. A substantial part of this energy can be released as heat in the supersonic diffuser, particularly when optical energy is not being extracted from the cavity. Heat release is harmful by reducing flow stagnation pressure and the pressure recovery potential. Furthermore, heat release can choke the diffuser, i.e. the diffuser cannot pass the flow at the desired upstream condition, so that the laser is inoperable. Diffuser design must minimize heat release penalties in order to reduce pressure losses and avoid the choked condition.

Conventional supersonic diffusers are simply long flow ducts. The duct length allows for a train of shocks and expansions in which the boundary layer detaches from the wall and is pumped by the core flow through turbulent mixing and viscous shear. Required lengths scale to the transverse duct dimension and increase with the Mach number. For avoiding cavity optical quality degradation, these diffusers depend entirely on being sufficiently long so that the shock train is safely downstream of the cavity, but disturbances can still reach the cavity through the boundary layers. In these diffusers thermal choking is avoided by balancing the expected heat release with cross-sectional area expansion. However, area expansion unavoidably reduces the pressure rise achieved by the diffuser.

Long-duct diffusers lack compactness and their long flow residence times encourage significant heat release. Some diffuser designs introduce splitter vanes across the flow to subdivide the duct into smaller, independent ducts with proportionately less required length. In general, multiple splitting results in trapping the boundary layer within a few of the small subducts which thus have high boundary-layer/coreflow ratio and hence a smaller sustainable pressure rise than the original unsplit duct. Since these weakened subducts dictate the possible pressure rise, the performance of the whole diffuser is diminished. Splitting has no significance for optical cavity isolation other than the length effect.

Some supersonic diffuser designs have porous or perforated walls at the entrance. The boundary layers are withdrawn through these walls. If the boundary layers are completely removed the diffuser pressure rise can be realized through a single, very-short shock, nearly an ideal normal shock. The required diffuser length is then little more than the length for suction walls. Since the cavity flow is already at low pressure, a substantial mechanical pumping system and vacuum collection manifold must be provided.

In another pressure recovery technique, the diffuser is eliminated altogether. The supersonic cavity flow is put directly to the ejector pump which becomes a so-called supersonic/supersonic ejector. This type of ejector is not as well suited to laser applications because shocks and separations which can be induced in the supersonic inflow by the nozzle hardware can disturb upstream conditions in the optical cavity. Moreover, heat release in supersonic flow both upstream and within the ejector causes greater stagnation pressure loss than in subsonic flow.

SUMMARY OF THE INVENTION

A compact diffuser for achieving pressure recovery by inducing a single near-normal shock in the supersonic coreflow from the optical cavity of a chemical laser while separately pumping the cavity wall boundary layers to the recovery pressure. The diffuser includes splitter plates with sharp leading edges separated from the cavity walls by approximately the boundary layer thickness to form boundary layer scoops that take off the boundary layers of the cavity plus a small amount of the cavity coreflow. The diffuser includes external boundary ejector chambers, formed between the splitter plates and external walls, where the scooped boundary flows are pumped to recovery pressure by ejector systems, preferably arrays of small supersonic primary nozzles or energizers. The ejector system can achieve such low pressure that the subsonic component of the scooped boundary flow is choked against the scoop inlet corners formed by the ejector chambers. This choked condition isolates the laser cavity from the boundary ejector chamber operation and protects the optical path against disturbances. The supersonic coreflow within the laser cavity passes to the channel between the splitter plates and, by virtue of having no boundary layers, can sustain a single, sharp, near-normal shock to achieve pressure recovery. The sharp leading edges of the splitter plates may be specially shaped to help induce the coreflow shock. The boundary ejector chamber flow and shocked coreflow are recombined downstream for pumping to exhaust pressure or other treatment.

OBJECTS OF THE INVENTION

It is an object of the invention to reduce the length of supersonic diffusers. It is another object of the invention to obtain a single near-normal coreflow shock to maximize pressure recovery.

It is also an object of the invention to provide a diffuser that can isolate the upstream flow from downstream influence.

It is also an object of the invention to reduce the heat release in the diffuser section to maximize pressure recovery.

Still another object of the invention is to lower the length to height ratio of the supersonic diffuser.

It is a further object of the invention to reduce the weight of the diffuser.

Other objects, advantages, and novel features of the present invention will become apparent from the following detailed description of the invention when considered in conjunction with the accompanying drawings.

DETAILED DESCRIPTION OF THE PREFERRED EMBODIMENT

Figure 1:
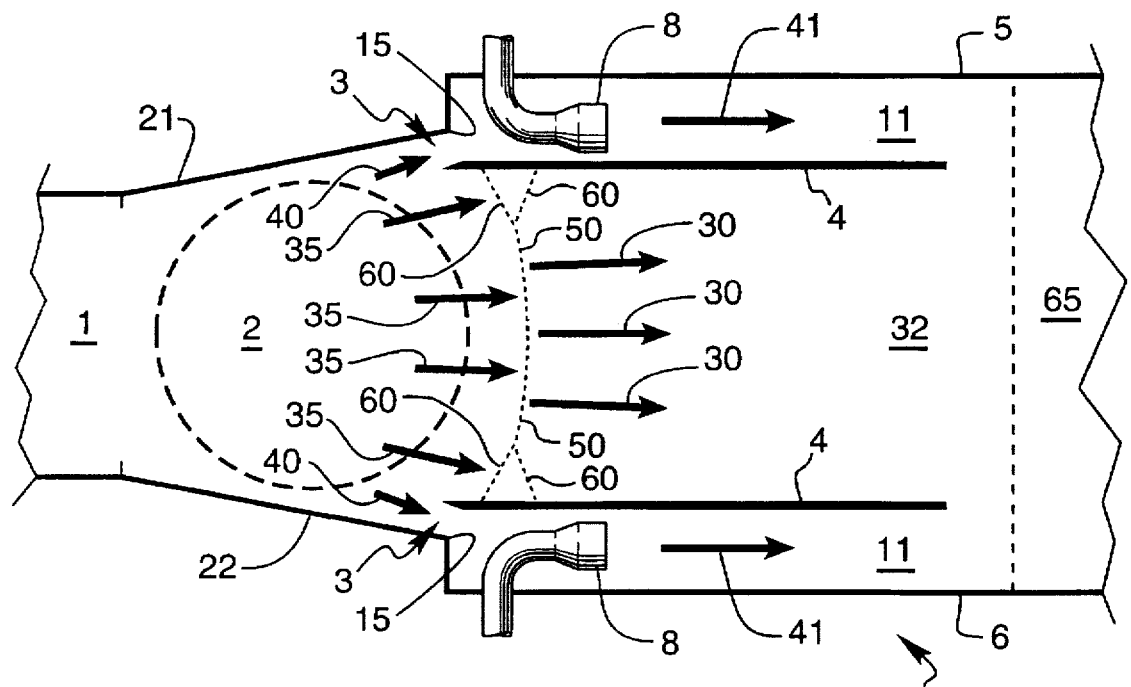
FIG. 1 is a side view of a laser cavity and diffuser having coreflow/boundary splitters, boundary layer scoops, and boundary ejector chambers.

FIG. 1 shows a laser nozzle 1 which discharges flow into a cavity 2 in which a laser beam can gain intensity. At the discharge end of the cavity 2 is a diffuser system 25 obtaining pressure recovery in the supersonic flow coming from cavity 2. The diffuser system has boundary layer scoops 3 formed by flow splitter plates 4 located at about one boundary-layer thickness distance from the cavity top wall 21 and the cavity bottom wall 22. The diffuser system has boundary ejector chambers 11 formed by a top outer wall 5 and a bottom outer wall 6 separated by several boundary-layer thicknesses from the splitter plates 4.

The boundary layer scoops 3 take the boundary layer flows 40 away so that the supersonic coreflow 35 entering the channel 32 between the splitter plates 4 can achieve a single sharp near-normal shock 50 bringing it to a higher pressure. The shock 50 is slightly curved through the center of coreflow chamber 32 and has oblique-shock forks 60 attaching to the splitter plates 4. The boundary layer flows 40 taken off at scoops 3 go into the boundary ejector chambers 11 adjacent to the coreflow chamber 32. In the boundary ejector chambers 11, the boundary flow 40 mixes with the larger and more-energetic flow from an array of small supersonic energizer nozzles 8. The mixed flow 41 is given sufficient energy to achieve equal or greater pressure than the coreflow shock.

Figure 2:
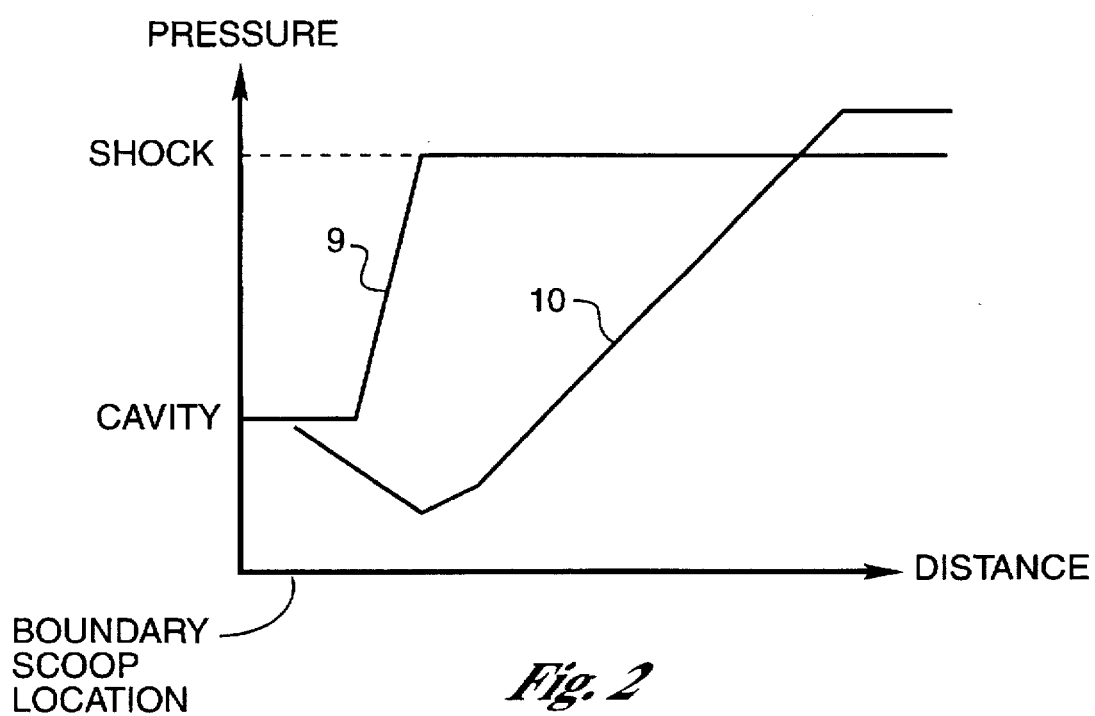
FIG. 2 is a plot of the pressure recovery for the shocked coreflow and for the scooped and pumped boundary flow.

FIG. 2 shows a comparison between the coreflow 35 pressure rise and the pumped boundary flow 40 pressure rise as functions of distance in the diffuser. The coreflow pressure 9 has a sudden rise produced by the single shock 50 in the central or coreflow part of the diffuser. The pumped boundary flow pressure 10 first decreases as it enters through the boundary layer scoop 3 into the suction end of the boundary ejector chamber 11. Subsequently the boundary flow 40 mixes with the energizers 8 flow and the boundary flow pressure then rises in the ejector mixed flow 41 to at least the coreflow shock pressure over a distance appropriate to ejector action. The ejector mixed flow 41 and the coreflow 30 are combined at the downstream end of the splitter plates 4 and brought to the exhaust pressure by the final pressure recovery system ejector 65.

Figure 3:
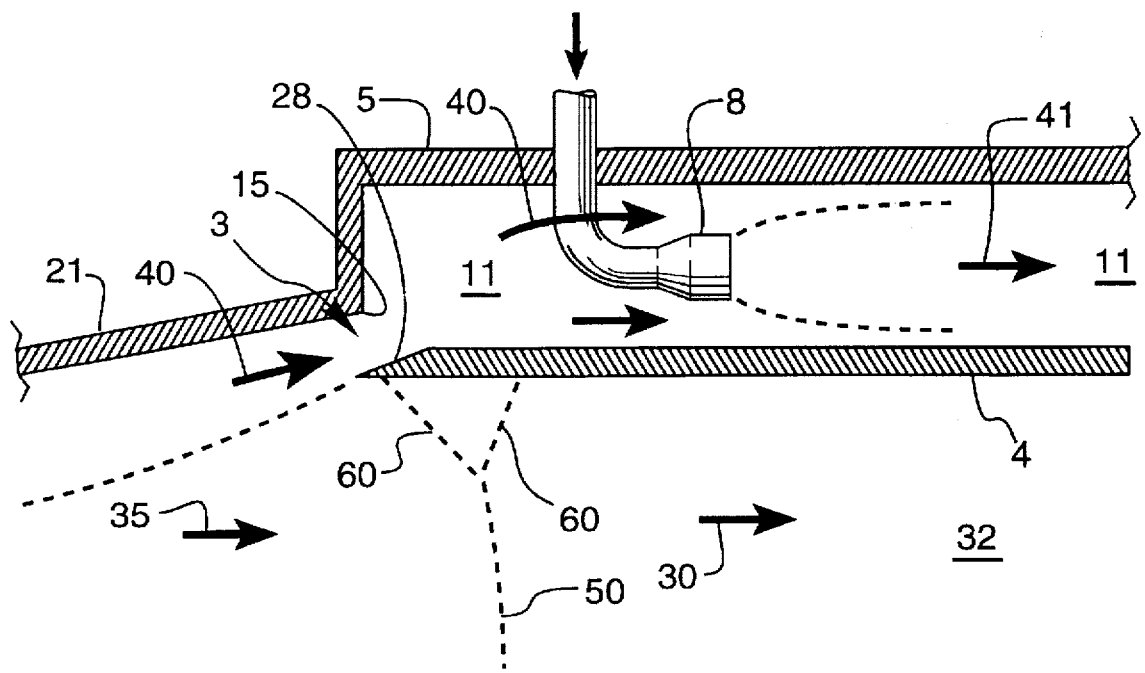
FIG. 3 is an enlarged sideview of the laser cavity exit near the top wall and of the top wall diffuser system.

FIG. 3 is a more detailed view of the boundary layer scoop 3 inlet formed by the splitter plate 4 and the laser cavity top wall 21, and of the boundary ejector chamber 11 containing the energizer nozzles 8. The leading edge 28 of the splitter plates 4 is sharp and is flat on the coreflow side so that the supersonic coreflow 35 can enter the channel 32 between the splitter plates 4 without obstruction. The supersonic coreflow 35 enters the channel 32 without any boundary layers and hence can immediately undergo a single shock 50 to subsonic coreflow 30 at higher pressure. The angle on the coreflow side of the leading edge 28 may be specially prescribed to help promote the shock 50, but this feature is not necessary to the operation.

Ejector action by the supersonic energizer nozzles 8 flow produces low pressure just downstream of the boundary layer scoop 3. The boundary layer flow 40 accelerates into the boundary layer scoop 3 and the edge of the supersonic core flow 35 expands and turns toward the boundary. The subsonic portion of the accelerating scooped boundary layer flow 40 is constricted between the turning supersonic flow and the wall. For sufficiently low pressure downstream of the boundary layer scoop 3, the subsonic boundary flow will choke against the corner 15 formed by the wall step to the boundary ejector chamber 11. The choked condition isolates the laser cavity 2 from downstream influence passing through the boundary layer flow 40.

Figure 4:
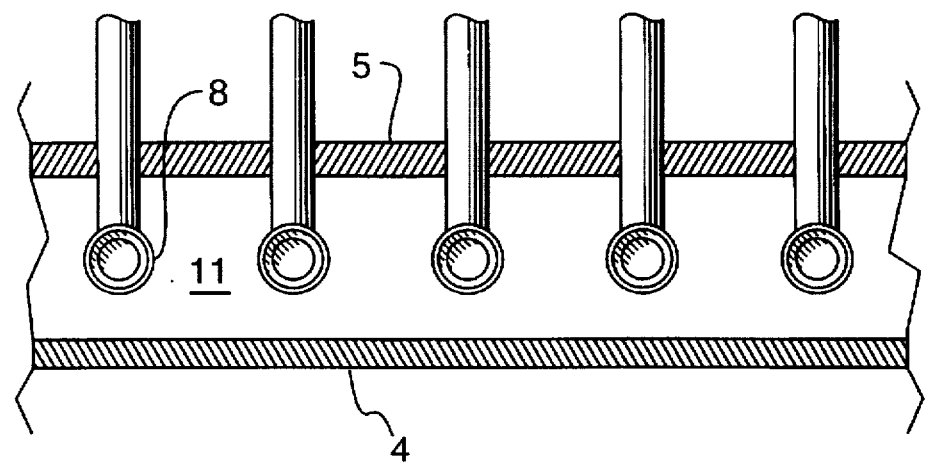
FIG. 4 is an upstream view of the boundary ejector chamber showing the array of energizer nozzles for pumping the scooped boundary flow.

FIG. 4 is an upstream view of the boundary ejector chamber 11 showing an array of small energizer nozzles 8 with spacing as required to provide ejector pumping action over the flow area of the chamber. The boundary layer flow 40 proceeds to the energizer nozzles 8 and mixes with the energizer flow. The resulting energetic flow 41 then rises to a pressure equal to or greater than the pressure of the subsonic coreflow 30 on the coreflow chamber 32.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A compact diffuser comprising:

a cavity having a top cavity wall, a bottom cavity wall, a cavity entrance and a cavity exit for containing a gas flow to be diffused for pressure recovery, the gas flow entering the cavity entrance having a boundary layer flow along the top cavity wall, a boundary layer flow along the bottom cavity wall, and a supersonic central core flow between the top and bottom boundary layer flows, a top boundary ejector chamber and a bottom boundary ejector chamber attached to the cavity exit, and a core flow chamber therebetween, a splitter plated having a leading edge proximate the top cavity wall at the cavity exit and a splitter plated having a leading edge proximate the bottom cavity wall at the cavity exit, the splitter plates forming a boundary wall between the boundary ejector chambers and the core flow chamber, the leading edge of the splitter plate providing a boundary layer scoop for separating the boundary layer flow and the core flow, whereby the boundary layer flows enter the boundary ejector chambers at the boundary layer scoops and the core flow enters the core flow chamber, such that the core flow undergoes a single near normal shock to a higher subsonic pressure on entering the core flow chamber, at least one ejector nozzle in the top boundary ejector chamber and at least one ejector nozzle a bottom boundary ejector chamber to pump the boundary layer flows to the same or greater pressure as the core flow in the core flow chamber, the splitter plates having a trailing edge, the pumped boundary layer flows and the core merging at the trailing edge of the splicer plates before exiting the diffuser.

2. A compact diffuser as in claim 1 wherein, a corner in the in the boundary ejector chambers proximate the boundary layer scoop chokes the boundary flow to the chamber.

3. A compact diffuser as in claim 1 wherein, the splitter plates have leading edges with angles to help induce a single shock in the core flow chamber.

4. A compact diffuser as in claim 2 wherein, the splitter plates have leading edges with angles to help induce a single shock in the core flow chamber.

* * * * *